United States Patent [19]
Hekimian et al.

[11] 3,711,773
[45] Jan. 16, 1973

[54] PHASE JITTER METER

[75] Inventors: Norris C. Hekimian, Rockville, Md.; John L. Kelly, Washington, D.C.

[73] Assignee: Hekimian Laboratories, Inc., Rockville, Md.

[22] Filed: July 9, 1970

[21] Appl. No.: 53,531

[52] U.S. Cl. .................. 324/83 R, 331/117, 324/98
[51] Int. Cl. ........................ G01r 25/00, H03d 13/00
[58] Field of Search ............. 324/83 A, 83 D, 83 FE; 328/133; 331/117, 18, 25; 329/122

[56] References Cited

UNITED STATES PATENTS

| 3,449,691 | 6/1969 | Pasternack et al. | 331/18 |
| 3,323,053 | 5/1967 | Southern | 324/83 D |
| 3,286,176 | 11/1966 | Birnboim | 324/83 D |
| 3,209,271 | 9/1965 | Smith | 329/122 |
| 3,005,151 | 10/1961 | Ule | 324/83 D |
| 2,793,347 | 5/1957 | Clark | 328/133 X |
| 3,059,187 | 10/1962 | Jaffe | 324/83 FE |
| 3,231,834 | 1/1966 | Watanabe | 331/117 |
| 3,396,345 | 8/1968 | Hoeppel | 331/117 |
| 3,548,321 | 12/1970 | Duquesne | 324/83 D |

OTHER PUBLICATIONS

Yu; Electronics; Nov. 1953, pp. 178-180.

Primary Examiner—Alfred E. Smith
Attorney—Rose & Edell

[57] ABSTRACT

A system is disclosed for monitoring short term amplitude and phase variations and measuring average and peak-to-peak phase jitter experienced by a test signal transmitted through a system under test. Phase detection is achieved with an exclusive OR gate which compares the phase of the test signal with that of a reference signal provided by a voltage-controlled oscillator (VCO), and provides an output signal having a frequency twice that of the test signal and a duty cycle proportional to test signal phase displacement. This output signal is converted to a DC signal which, in addition to serving as a basis for measurement of the average and peak-to-peak phase jitter of the test signal, controls the phase of the VCO to thereby phase lock the reference signal to the test signal. Short term amplitude variations experienced by the test signal are compared against an adjustable predetermined range in order to provide an indication whenever the amplitude is outside the selected range. A novel test signal generator is also disclosed using a modified Hartley oscillator configuration to provide an output signal having high amplitude and frequency stability independently of the type of transistor employed.

22 Claims, 8 Drawing Figures

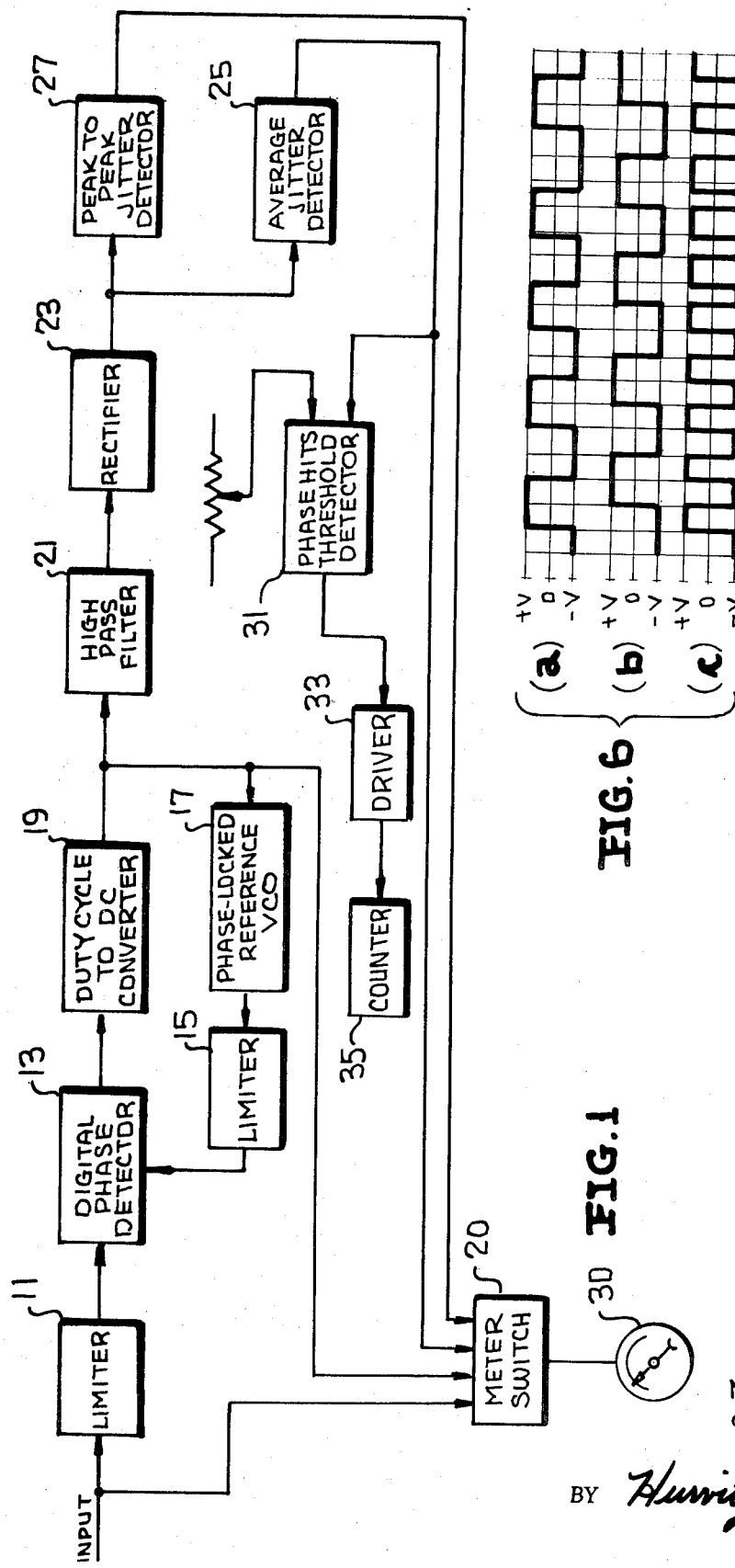
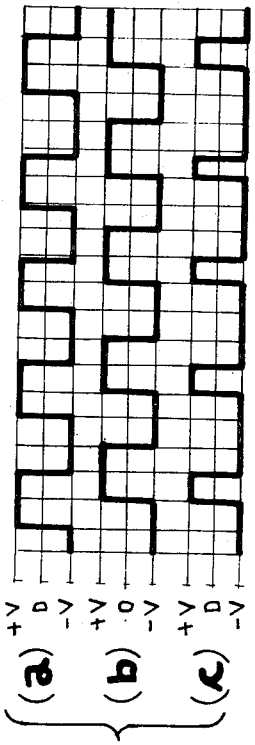
FIG. 6
FIG. 7
FIG. 1
INVENTORS
NORRIS C. HEKIMIAN
& JOHN L. KELLY
BY Hurvitz & Rose
ATTORNEYS

PHASE JITTER METER

BACKGROUND OF THE INVENTION

The present invention relates to measurement of performance parameters of communication signal transmission channels, and more particularly to the measurement of long and short term phase and amplitude variations of signals transmitted through a voice frequency communications channel. Although the present invention is described in terms of voice frequency communications, it will be understood by those familiar with the technology employed herein that the techniques of the present invention are appropriate for the measurement of phase jitter and amplitude variations in various types of signal transmission channels.

Data transmission at rates of 1,200 bits per second and greater is particularly sensitive to long and short term phase jitter as well as long and short term amplitude variations, these parameters ranking in importance with signal-to-noise ratio, impulse noise, frequency response, and envelope delay distortion in determining transmission channel performance. Phase jitter and amplitude variations may be introduced by the transmission medium, by line termination variations, or by multiplex, carrier, and radio equipments. The ability to measure these important performance parameters and to isolate those units in the transmission system which are causing unacceptable performance is an important and necessary function in maintaining high quality signal transmission.

In the measurement of phase jitter, it has been common practice in the prior art to utilize a sinusoidal discriminator or box car detector to monitor phase variation between a test signal and a reference signal. The measurement capability of such devices is limited in that their output amplitude versus input phase characteristics are non-linear except for relatively small phase variations; consequently, following circuitry must be adjusted to compensate for detector linearity. It is therefore an important object of the present invention to provide a phase detector having a linear amplitude versus phase characteristic over a relatively large range of phase variations between two input signals. In addition, an object of the present invention is to provide an accurate phase detector permitting a wide range of linear phase measurement yet which employs relatively simple circuitry.

The term "hits" is employed herein in the frame of reference of "amplitude hits" and "phase hits". As thus employed, the term hits refers to sudden and temporary variations in signal level (amplitude) and/or phase, which variation is sufficient to impair signal transmission accuracy. Amplitude and phase hits have numerous sources, such as radio channel fading, line switching, impulse noise from other circuits and electrical equipment, and power supply variations. By monitoring the number of amplitude and phase hits occurring within a predetermined time period, a significant insight into transmission system performance is gained, and the ability to correct incipient problems in signal transmission is improved. It is therefore another object of the present invention to provide means for monitoring amplitude and phase hits in a signal transmission system.

Another problem with which the present invention is concerned is the provision of a test signal which is sufficiently stable in amplitude and frequency to permit accurate measurements of phase and amplitude hits. Prior art generators exhibit instabilities which cause serious measurement inaccuracies.

SUMMARY OF THE INVENTION

In accordance with one aspect of the present invention an exclusive-OR gate is employed to effect phase detection between a test signal and a reference signal of the same nominal frequency but quiescently displaced in phase by 90°. The output signal of the exclusive OR gate is a square wave having positive and negative levels of the same magnitude and a duty cycle proportional to deviation from the quiescent phase displacement between the signals. The square wave duty cycle is converted, by means of a low pass filter, to a proportional dc voltage level which is utilized to phase-lock a voltage controlled oscillator (VCO) to the test signal; the VCO provides the reference signal. A relatively slow response (for example 5 Hz) is selected for the phase-locked loop to prevent phase-locking in response to relatively short test signal phase variations. The duty cycle of the square wave, and hence the dc level, is linearly proportional to phase variations up to ± 90° from the quiescent displacement. In addition, the square wave frequency is twice that of the test signal, thereby minimizing the cut-off requirement of the low pass filter.

In accordance with another aspect of the present invention the dc level applied to the VCO is filtered to remove the dc component therefrom, rectified, and applied to a metering circuit to measure average and peak-to-peak phase jitter. The filtered signal is also compared to a threshold level at a phase hit comparator which provides a phase hit count pulse each time a phase hit of a predetermined but adjustable magnitude occurs.

In accordance with another aspect of the present invention the test signal is processed by a wide dynamic range automatic level control (ALC) circuit which, for a relatively large range of test signal amplitudes, provides a relatively constant average output signal amplitude. This signal is applied to both high and low threshold detectors and is also integrated and applied to a reference amplifier having a known well-regulated gain. The reference amplifier output signal is applied across a resistor string, pairs of junctions of which are selectable by means of a pair of gauged switches to provide threshold levels for the high and low threshold detectors. Sudden variations in the ALC output signal amplitude outside the selected threshold range trigger the threshold detectors to provide output count pulses. The amplitude hits count pulses and the phase hits count pulses are counted individually, and a separate counter is provided to sum phase-hit and amplitude-hit coincidences.

A still further aspect of the present invention provides for a circuit which detects signal level drop out or fade for more than a predetermined period of time. These drop outs are also counted and during their presence count pulses from the phase and amplitude hit comparator circuits are disabled to prevent erroneous counts from being added to the respective hit counters.

In accordance with another aspect of the present invention a test signal generator is included as part of the monitoring equipment to make available at all times a frequency and amplitude stable test signal to be transmitted through a system under test. The generator comprises a transistor oscillator of modified Hartley configuration wherein feedback coupling to the base electrode is effected through a diode but the base bias circuit is independent of the diode. The non-linear action required to establish an equilibrium amplitude in the oscillator is effected by the diode, rather than the transistor thereby preventing distortion which would otherwise result from transistor saturation.

Consistent with the foregoing description, it is therefore an object of the present invention to provide a novel phase detection circuit wherein a test signal and reference signal are compared for relative phase deviation in an exclusive OR gate and wherein the reference signal is provided by a voltage controlled oscillator (VCO) phase-locked loop to the test signal by controlling the phase of the VCO with a signal of amplitude proportional to the phase difference detected at the exclusive OR gate.

It is another object of the present invention to provide a phase detector of the type described above in conjunction with circuitry for monitoring average phase jitter, peak-to-peak phase jitter, and phase hits.

It is another object of the present invention to provide a phase detector of the type described in a system for monitoring phase hits occurring in a test signal along with amplitude hits and coincidence of phase and amplitude hits.

It is still another object of the present invention to provide a system for monitoring performance of a signal transmission channel wherein the following parameters are readily monitored: average phase jitter, peak-to-peak phase jitter, phase hits, amplitude hits, coincidence of phase and amplitude hits, and signal drop out.

It is still another object of the present invention to provide a circuit for monitoring signal amplitude excursions outside an adjustable predetermined amplitude range.

Still another object of the present invention is to provide a circuit for establishing upper and lower amplitude limits for a signal relative to the average amplitude of the signal.

It is another object of the present invention to provide a test signal generator capable of supplying an oscillatory signal which is sufficiently stable in frequency and amplitude to permit accurate phase and amplitude hits detection.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein:

FIG. 1 is a block diagram illustrating the phase detection technique employed in the present invention;

FIGS. 6(a), 6(b), and 6(c) are timing diagrams illustrating the waveforms of input and output signals for the exclusive OR phase detector employed in the present invention;

FIGS. 7(a), 7(b), and 7(c) are timing diagrams illustrating the waveforms of input and output signals for a prior art phase detector.

DESCRIPTION OF THE PREFERRED EMBODIMENTS

Figure 2:
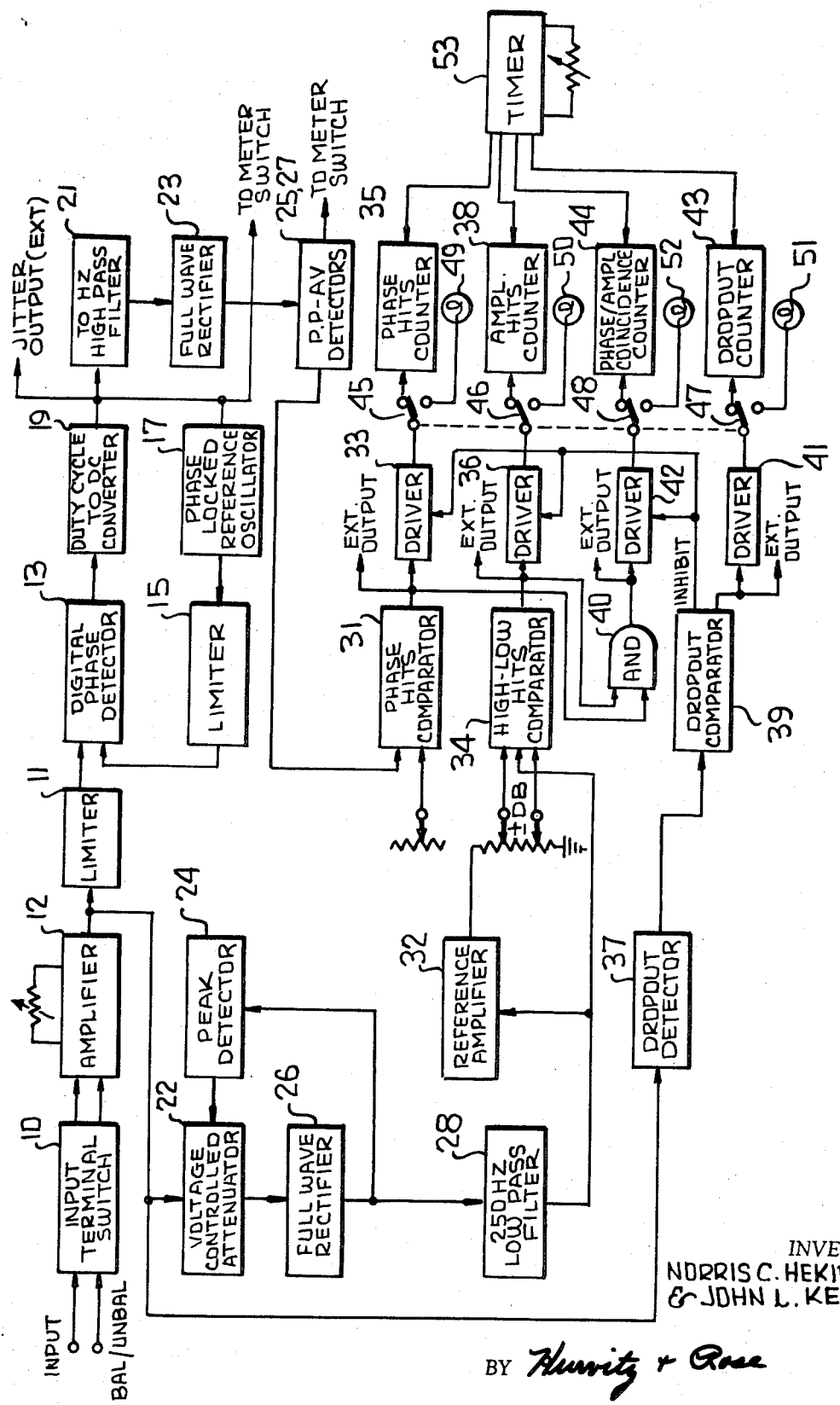
FIG. 2 is the block diagram of a system employing the principles of the present invention.

Referring specifically to FIG. 1 of the accompanying drawings, there is illustrated in functional block diagram format a system for providing accurate measurement of average phase jitter, peak-to-peak phase jitter, and phase hits experienced by a test signal received from a transmission system under test. The test signal considered herein is an audio tone, for example at a frequency of 1,000 Hz. Other test signal frequencies may be employed with proper selection of component values; in addition phase deviation of high frequency signals can also be measured by utilizing the high frequency as a carrier for the audio tone, demodulating the carrier, and applying the resulting audio tone to the system of FIG. 1.

The incoming test signal is applied to a limiter 11 which provides a square wave version of the input signal, having zero-crossings in time coincidence with those of the input signal. The output signal from limiter 11 is applied to a digital phase detector 13 which also receives a reference square wave from a limiter circuit 15. The input signal to limiter circuit 15 is derived from a voltage controlled oscillator (VCO) 17, the output signal from which has a nominal frequency equal to that of the input signal, and is quiescently shifted in phase from the input signal by 90°. The VCO phase is controllable by application of a dc voltage thereto. Digital phase detector 13 comprises an exclusive OR gate which provides an output signal whenever either but not both of the input square waves are at their high signal level (binary 1). The waveform of the exclusive-OR gate is a square wave having a duty cycle which varies from 50 percent in proportion to variations in phase displacement between the reference and test signals from the quiescent 90° displacement. The waveforms of FIGS. 6(a), 6(b) and 6(c) represent the test, reference, and exclusive-OR signals respectively. It is noted that the exclusive-OR signal alternates between +V and −V at twice the test signal frequency, or 2 KHz in the example chosen above. When the phase displacement between the test and reference signals is constant at 90°, the exclusive-OR signal maintains a 50 percent duty cycle; that is, the signal resides at the +V and −V levels for equal intervals of time. If the test signal phase varies, for example in an advancing manner relative to the reference signal as depicted in the third and fourth cycles in FIG. 6(a), the exclusive-OR signal duty cycle changes correspondingly (increased positive interval for advancing test signal phase). Likewise, a retarded test signal phase produces an increased negative portion of the exclusive-OR cycle.

The exclusive-OR signal provided by phase detector 13 is applied to a duty cycle-to-dc converter circuit 19 which, as the name implies, provides a dc signal of amplitude and sense proportional to the duty cycle of the exclusive OR signal. This dc signal is therefore proprtional to the instantaneous phase difference between the input and reference signals and is utilized to control the phase of VCO 17, the latter being thereby phase-locked to the input test signal. The components associated with VCO 17, which are described below in greater detail, are designed to provide a loop band width of approximately 5 Hz for the phase-locked reference oscillator. In this manner, short-term phase variations in the test signal are not effective to change the phase of VCO 17, but long-term phase changes cause the VCO phase to seek the quiescent 90° displacement.

The dc output signal from converter 19 is applied to a high pass filter 21, having a cut-off frequency of 10 Hz or less, which serves to remove the dc component from the signal and provides an output signal amplitude and polarity which vary in response to instantaneous phase differences between the input and reference signals. The output signal from filter 21 is applied to rectifier 23 where it is full wave rectified and applied to an average jitter detector circuit 25. This circuit provides a dc output signal having an amplitude corresponding to the average value of the rectified signal provided by rectifier 23. The signal from detector 25 is applied to a meter switch 20 which selectively applies signals representing respective parameters to a meter 30.

The output signal from full wave rectifier 23 is also applied to a peak-to-peak jitter detector circuit 27, the output signal from which is also applied to meter switch 20. Detector 27 has a time constant of approximately 25 seconds and provides peak detection of repetitive signals down to the 10 Hz (or lower) low frequency cut-off point of the phase jitter signal provided by filter 21. The output signal from detector 29 is also applied to meter switch 20 from which it may be selectively applied to meter 30 for read out.

The average jitter signal from average jitter detector circuit 25 is also applied to a phase hits threshold detector circuit 31. The latter also receives an adjustable dc level against which the signal from detector 25 is compared. When the average jitter signal amplitude exceeds the adjustable dc level a driver amplifier 33 is pulsed and a count is registered at counter 35.

In a preferred embodiment, duty cycle-to-dc converter 19 comprises a low pass filter having a cut-off frequency of approximately 250 Hz. This cut-off frequency is selected on the basis of two considerations. First, the filter must block the 2 KHz component of the exclusive OR signal. Second, the filter must pass short term phase variations of interest. The 250 Hz cut-off effectively blocks the 2 KHz component and pass phase variations having durations of at least 4 to 5 ms. Phase variations of shorter duration are generally considered impulse noise rather than phase hits and therefore need not be registered at counter 35. Impulse noise is readily measurable by other commercially available equipments and is not monitored by the system of the present invention.

As illustrated in FIG. 1, meter switch 20 is selectively actuable to individually apply any of the following signals to meter 30: input signal, the dc output signal from phase detector 13, the average phase jitter signal from detector 25, and the peak-to-peak phase jitter signal from detector 27.

The block diagram of a multipurpose transmission performance monitoring system, utilizing the phase detection techniques described above is illustrated in FIG. 2. Like components in FIGS. 1 and 2 are designated by the same reference numerals. The incoming test signal, which may be balanced or unbalanced, is applied to an input termination switch 10 where it is terminated in the desired impedance and selectively coupled to an input amplifier 12. The latter has an adjustable gain which permits the setting of the signal level to the desired value at the output terminal of amplifier 12. The output signal from the amplifier is applied to limiter 11 from which it is processed by the circuitry illustrated in FIG. 1.

The output signal from amplifier 12 is also applied to an automatic level control circuit including a voltage controlled attenuator 22, a full wave rectifier 26 and a peak detector 24. This circuit, as described subsequently in detail, provides a substantially constant average output signal level in response to a relatively wide dynamic range of input signal levels. In a particular embodiment, the average output signal from the automatic level control circuitry is maintained constant within ± 2 db in response to input range variations of up to 30 db. Corrections of the average output level are made with a time constant of approximately 10 seconds so that short term amplitide variations can be monitored by the following circuitry. The output signal from the automatic level control circuitry is applied to a low pass filter 28 having a cut-off frequency at 250 Hz so that the ac component of the test signal is blocked. The signal from filter 28 is therefore at an average dc level determined by the automatic level control circuitry. This signal is applied to a reference amplifier 32 and a high-low hits comparator 34. Reference amplifier 32 integrates the signal from filter 28 and provides an output signal at an amplitude which represents the long term average of the low pass filter output signal. The output signal from reference amplifier 32 provides selectively adjustable reference levels above and below the nominal level of the output signal from amplifier 28, which reference levels serve as thresholds for comparison against short term variations in the amplitude of the signal from filter 28 at the high-low hits comparator 34. Whenever short term amplitude variations (amplitude hits) cause the output signal from filter 28 to exceed the high reference level or become lower than the low reference level, comparator 34 activates driver 36 to apply a pulse to the amplitude hits comparator 38. As described above with reference to the phase hits comparator, filter 28 is chosen to provide a count to the amplitude hits counter only when the amplitude variation subsists for more than 5 ms. This duration is chosen for a particular application only and of course can be chosen at some other value if desired.

The output signal from amplifier 12 is also applied to a drop out detector 37 which is activated when the signal drops below a predetermined level. If detector 37 is activated for a specified period of time, for example 300 ms, drop out comparator 39 triggers a driver amplifier 41 to increment drop out counter 43. During the period in which drop out comparator 37 is activated, comparator 39 inhibits driver amplifiers 33 and 36 to disable the input circuitry to the amplitude and phase hit comparators. This provides immunity to noise during a signal drop out interval when the automatic level control circuit gain is at a maximum.

Comparator 39 also responds to activation of detector 37 to inhibit driver amplifier 42 which is fed by an AND gate 40. AND gate 40 is a two-input AND gate which receives the output signals from the phase hit comparator 31 and the high-low amplitude hits comparator 34. Whenever there is a time coincidence between phase and amplitude hits, AND gate 40 is activated to in turn activate driver 42 which applies a count pulse to the phase/amplitude coincidence counter 44.

The output signal from each of drivers 33, 36, 41 and 42 are applied to switches 45, 46, 47 and 48, respectively, which permit selective application of the driver output signals to either counters 35, 38, 43 and 44 or indicator lamps 49, 50, 51 and 52. In addition, an adjustable timer 53 may be provided to control power to the various counters 35, 38, 43 and 44 for selected periods of time in order to permit unattended measurements to be performed. The timer operates by removing power from the counters at their driver circuits after pre-selected intervals of time.

The system of FIG. 2, apart from permitting measurement of average and peak-to-peak phase jitter, also provides the following capabilities: Detection and count of amplitude hits exceeding an adjustable amplitude threshold; detection and count of phase hits exceeding an adjustable phase threshold; the count of simultaneous amplitude and phase hits; the detection and count of signal drop outs. The measurement of phase and amplitude hits, as described above, is based on comparison of phase and amplitude variation against a preselected reference. Thus, if the phase reference is selected at 10°, a phase variation of 10° or greater and lasting 5 ms or longer results in an additional count being added to phase hit counter 35. The counter thus measures peak phase hits as differentiated from the peak-to-peak jitter measured by the meter on the basis of the signal delivered by the peak-to-peak detector 27. Likewise the amplitude hit threshold is selectable to permit incrementation of amplitude hits counter 38 each time the amplitude of the test signal varies from the reference level by a preselected amount.

To provide insight into the cause of phase and amplitude hits, the coincidence counter 44 is provided to register simultaneous phase and amplitude hits. If an extended duration hit occurs in either phase or amplitude, counter 44 registers multiple hits occurring in the other parameter. For example, if during a long duration amplitude hit several phase hits occur, these individual phase hits will be totalized at coincidence counter 44. It is therefore possible for the count in coincidence counter 44 to exceed the number of counts in phase hits counter 35 or the number of counts in amplitude hits counter 38; however the count in coincidence counter 44 cannot exceed the sum of the counts in the amplitude and phase hits counters 38 and 35 respectively.

Figure 3:
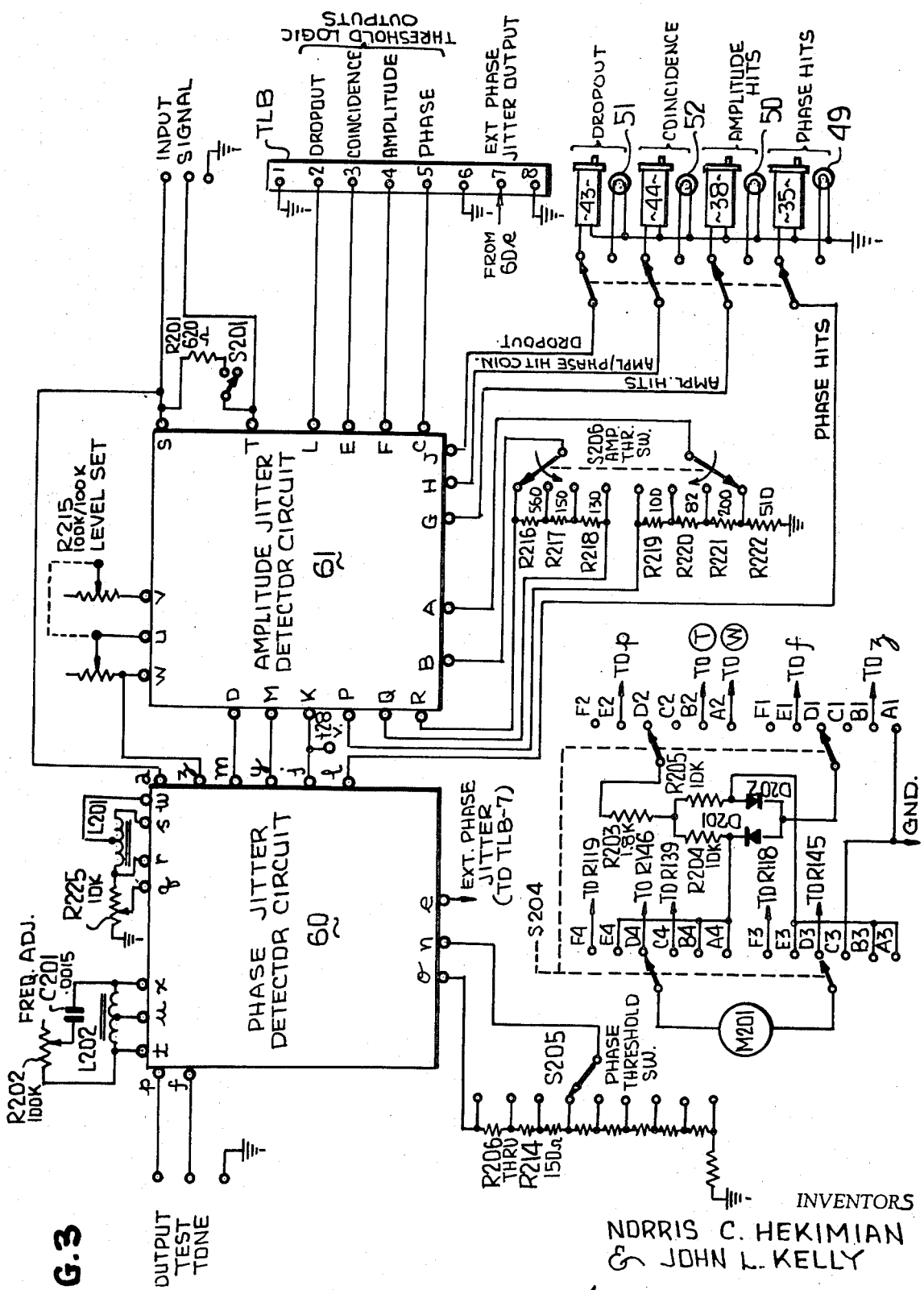
FIGS. 3, 4 and 5 constitute a schematic diagram illustrating the system of FIG. 2 in substantial detail.
Figure 4:
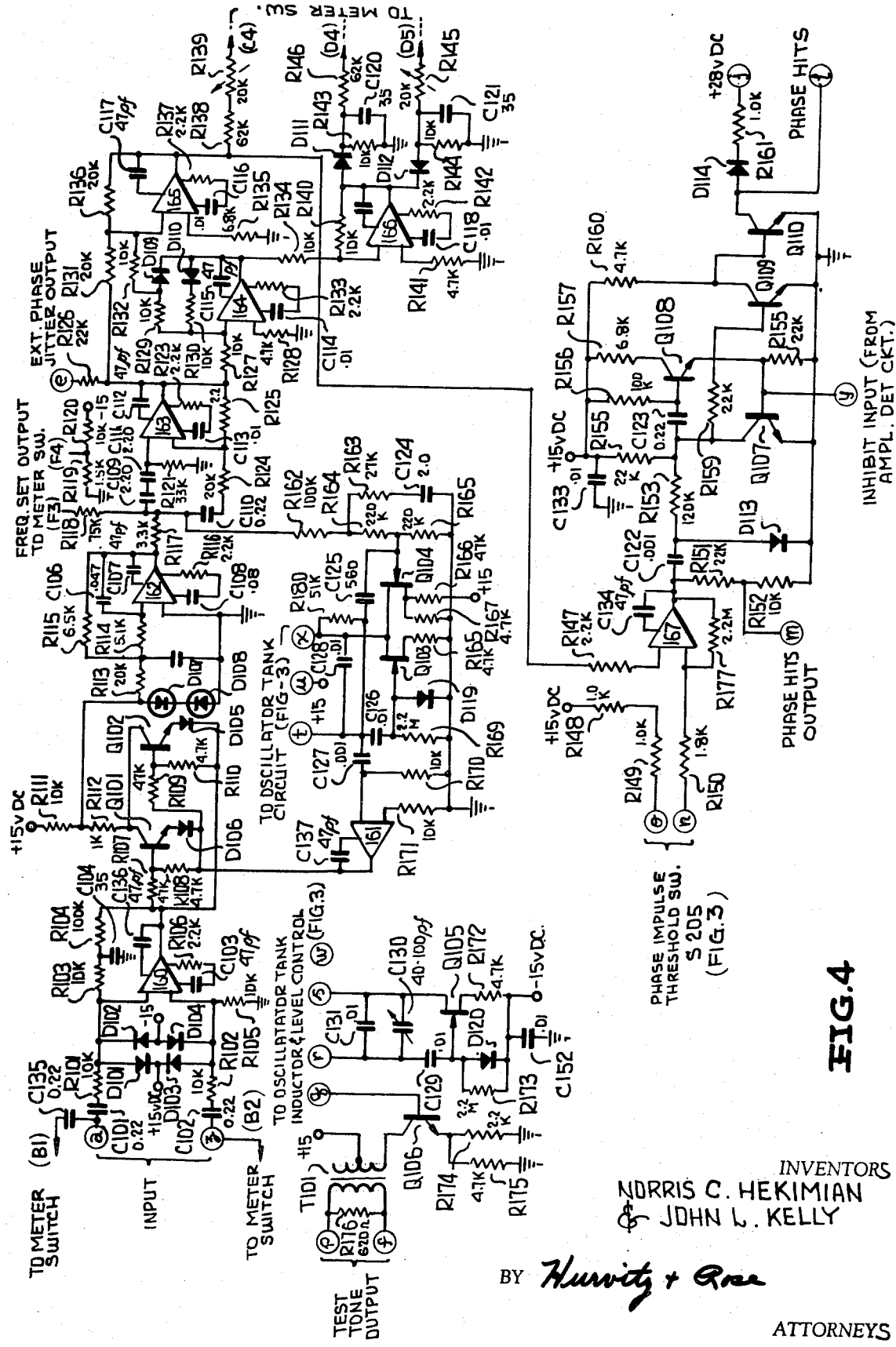
Figure 5:
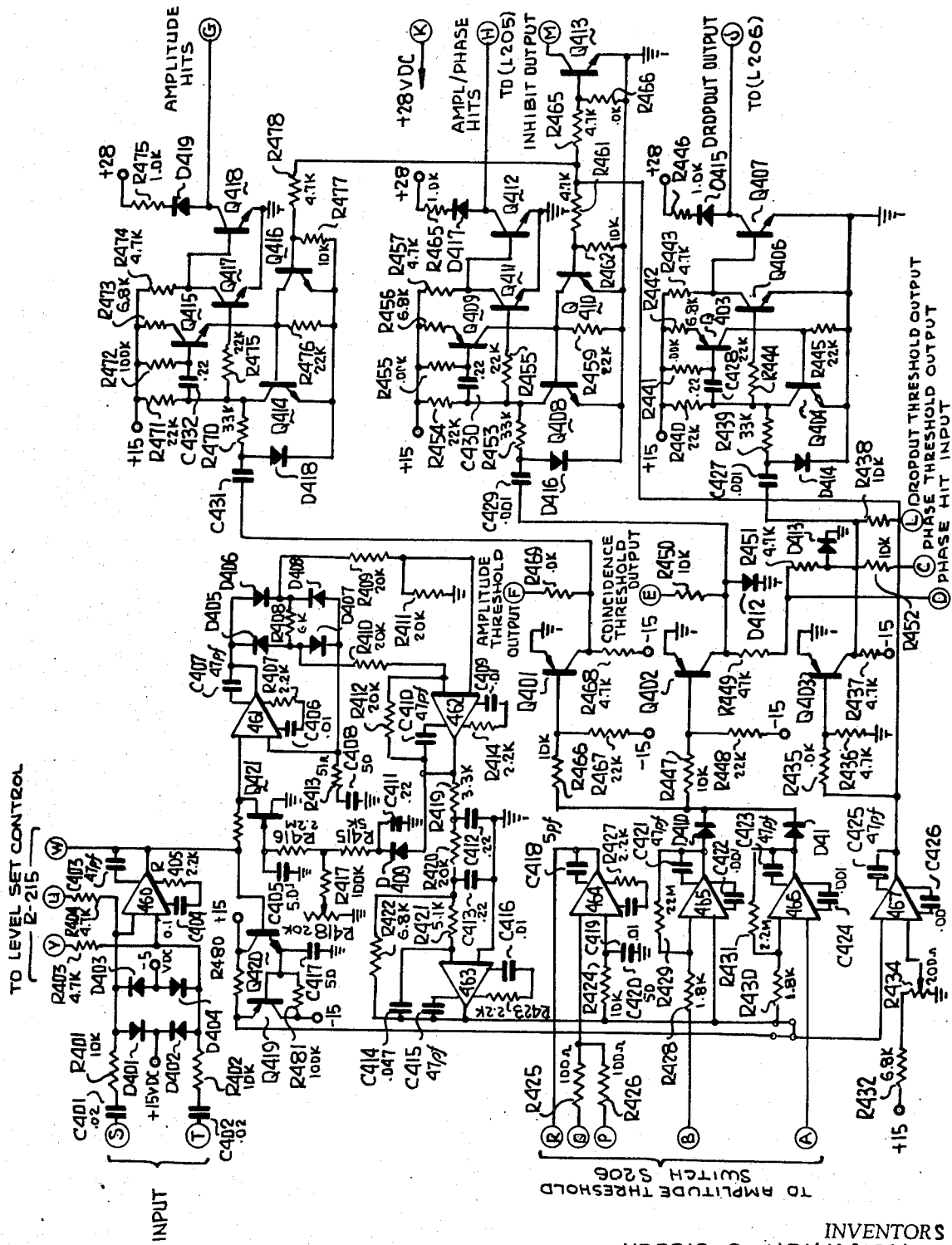

Referring to FIG. 3 of the accompanying drawings there is illustrated a schematic diagram in which the phase jitter detector circuitry is represented generally by the reference numeral 60 and the amplitude jitter detector circuitry is represented generally by the numeral 61. The individual circuits 60 and 61 may be included on circuit boards illustrated in FIGS. 4 and 5, respectively, for purposes of the following description. Circuitry comprising part of the system of FIG. 2 which is not on either of the boards 60 and 61 is illustrated in detail in FIG. 3. Interconnection between components on the same board is designated schematically by utilization of alphabetically designated terminals illustrated at the periphery of each of the circuit boards 60 and 61 in FIG. 3. These alphabetically designated terminals have counter-part designations in the detailed schematic drawings of FIGS. 4 and 5. In addition, components on circuit board 60 (FIG. 4) are designated by numerals in the 100 series. Circuitry on board 61 (FIG. 5) is designated by numerals in the 400 series. Circuitry not on either board but illustrated in FIG. 3 is designated by numerals in the 200 series. Component values illustrated in FIGS. 3, 4 and 5 are intended for a particular embodiment of the present invention only; these component values are not to be construed as limiting the scope of the present invention. The following description refers to FIGS. 3, 4 and 5 interchangeably.

The input test signal may be selectively applied across impedance matching resistor R201 by means of switch S201 or across the abridging resistors R401, 402 to amplifier 12, corresponding to amplifier 460 in FIG. 5. Amplifier 460, as is the case with all amplifiers schematically represented by a triangular block in FIGS. 4 and 5, may be one-half of a dual operational amplifier such as Motorola model 1437 L. DC line currents are blocked by capacitors C401, C402, and voltage surge protection is provided by diodes D401, D402, D403, and D404. Amplifier 460 is connected as a differential amplifier which permits conversion of a balanced input signal to an unbalanced signal, and includes a gain control comprising level set potentiometer R215. The latter is usually initially set to provide a zero dbm signal at the amplifier output. Phase compensation for amplifier 460 is provided by resistor R405 and capacitors C403 and C404. The output signal from amplifier 460 is applied both to amplitude jitter detection circuitry and to amplifier 160 at circuit board 60. The level of the input signal for amplifier 460 may be monitored at meter M201 when switch S204 is placed in the appropriate position. More particularly, switch S204 is a four-pole six-position switch having its six positions designated by the letters A through F, inclusive and its four poles designated by the numerals 1–4, inclusive. Position B is utilized to monitor the input signal level. A dc blocking capacitor C135 at circuit board 60 (FIG. 4) is employed to ac-couple the input signal to the meter.

Differential amplifier 160 at circuit board 60 receives the level-adjusted signal via ac-coupling capacitors C101, C102. Surge protection is provided by diodes D101, D102, D103, D104 and phase compensation is provided by resistor R106 and capacitor C103. Differential amplifier 160 detects zero-crossings of the input signal and provides a square wave at its output terminal; the amplifier therefore serves as limiter 11, operating as an open loop zero-crossing detector. DC stabilization is provided by resistors R103, R104 and capacitor C104.

The output signal from amplifier 160 is applied to the digital phase detector 13 which includes transistors Q101 and Q102. These transistors and their associated components form an exclusive OR gate which provides the exclusive-OR square wave signal described above in relation to FIG. 6(c). The other of the exclusive OR input signals is provided by limiter or squaring amplifier 161 driven by (VCO) 17 comprising field effect transistor Q103 and its associated circuit components, including field effect transistor Q104 serving as a reactance modulator and an oscillator tank circuit consisting of inductor L202, capacitor C201, and variable resistor R202. An alternative oscillator configuration is described below in relation to FIG. 8. R202 permits adjustment of the VCO frequency over a narrow range so that the VCO reference signal may be initially set to 90° phase displacement from the test signal. The VCO is primarily a modified Hartley oscillator whose output signal is capacity coupled to limiter amplifier 161.

The output square wave from the digital phase detector has a duty cycle proportional to the phase difference between the test and reference signals. This square wave is applied across cathode-connected zener diodes D107 and D108 to provide constant amplitude output pulses for following circuitry. These pulses are applied directly to the duty cycle-to-dc converter which comprises an active low pass filter having a cut-off frequency at approximately 250 Hz. This active filter includes amplifier 162 and provides a three-pole Butterworth response using conventional filter design techniques. Passive components in the filter include resistors R113, R114, R115 and R117; and capacitors C105, C106 and C110. Resistor R116 and capacitor C107 are part of a compensating network for amplifier 162.

It is important to note at this point that the use of an exclusive OR configuration for the digital phase detector permits utilization of a relatively simple active low pass filter to perform the function of duty cycle-to-dc conversion. More particularly, and reference is made to FIGS. 6(a)-(c), utilizing the exclusive OR phase detection approach, phase slippage is detected between two signals which are quiescently 90° out of phase, as illustrated in FIGS. 6(a) and 6(b). The output square wave from such a phase detector, as illustrated in FIG. 6(c) and as described above, has a duty cycle proportional to phase displacement between the input signals. The frequency of the exclusive OR signal, importantly, is twice the input signal frequency. This is in distinction to the approach utilizing an AND gate for phase detection. In the AND gate approach the two normally 90° spaced signals, such as those illustrated in FIGS. 7(a) and 7(b), are compared and an output signal is provided, at FIG. 7(c), only when both input signals are high or at binary 1 level. The resulting output wave has a 25 percent quiescent duty cycle. Once phase slippage occurs in the AND gate approach, the duty cycle varies, but over a smaller range than with the exclusive OR approach. More importantly, the AND signal frequency is the same as the frequency of the test signal, or 1 KHz. This would place the detector output signal much closer to the pass band of the active filter utilized for the duty cycle-to-dc conversion and would therefore require an extremely sharp filter cut-off. More particularly, the 250 Hz cut-off frequency of the filter is important in determining rejection of impulse noise of 4 to 5 ms duration or less. If the phase detector signal were at 1 KHz, filter rejection above 250 Hz would have to be quite sharp. Not nearly so sharp a filter cut-off is required to reject the 2 KHz signal from the exclusive OR gate phase detector.

The output signal from the low pass filter is a dc voltage proportional to the instantaneous phase difference between the input and reference signals. This voltage is filtered by a network consisting of resistors R162 and R163 and capacitors C124, which provides a 5 Hz response for the phase-locked loop. The filtered signal is applied as a control signal to the voltage controlled oscillator. More particularly, the filtered voltage controls the reactance modulator section Q104 and the VCO to vary the effects of C125 in the oscillator tank circuit and thereby adjust the phase of the oscillator in response to phase differences existing between the test and reference signals. As mentioned above the VCO is phase-locked to the test signal. The 5 Hz band width of the phase-locked loop is sufficient to prevent the VCO from shifting to a new input phase in response to short term phase variations of less than 100 to 200 ms duration.

The output signal from the active low pass filter is also as coupled by capacitors C109 and C111 to amplifier 163. The output signal of amplifier 163 represents the actual phase jitter signal which is made available externally of circuit board 60 at terminal e via isolation resistor 126.

The output signal from amplifier 163 is also applied to rectifier and detection circuits including amplifiers 164, 165 and 166 and associated circuitry. Full wave rectification, required to obtain the absolute value of the phase jitter, is achieved by means of amplifiers 164 and 165. Amplifier 164 provides half wave rectification with feedback eliminating the effects of the off-set voltages of diodes D109 and D110. The negative half wave rectified signal provided by amplifier 164 is applied via resistor R132 to the input terminal of amplifier 165 where it is summed with the original output signal from amplifier 163 via resistor R131. Summation produces full wave rectification in the summed signal which is amplified by amplifier 165 and coupled to the metering circuit via resistor R138 and calibration resistor 139. This output signal from amplifier 165 may then be applied to meter M201 via switch S204, contact C4. The d'Arsonval movement of the meter effects averaging of this signal to provide an indication of average jitter.

Amplifier 166 receives the output signal from amplifier 164 to provide an output signal compensated for diode off-set voltages in both the positive and negative direction. Amplifier 166 is a unity gain driver amplifier for a positive peak detector comprising diode D111, resistor R143 and capacitor C120, and for a negative peak detector comprising diode D112, resistor R144 and capacitor C121. The output signals from these positive and negative peak detector circuits are applied through R146, R145 to meter M201 via contacts D3, D4 of S204 to provide an indication of peak-to-peak jitter. The detector time constant of approximately 0.5 seconds provides peak detection of repetitive signals down to the 10 Hz low frequency cut-off point of the phase jitter signal, which cut-off point is determined by capacitors C109 and C111 in conjunction with resistor R121 at the input to amplifier 163.

The full wave rectified jitter signal provided at the output of amplifier 165 is applied to differential amplifier 167 in the phase hits threshold detection circuit. Differential amplifier 167 compares the full wave rectified jitter signal to the threshold level set by threshold switch S205 (FIG. 3). Switch S205 is a nine-position single-pole switch in which different voltage levels appear at the switch arm in each of the nine positions. The output signal from amplifier 167 remains at a positive level until the phase jitter signal exceeds the threshold level determined by switch S205. When this level is exceeded the output signal of amplifier 167 abruptly changes to a negative voltage which returns to a positive level only when the input signal falls below the selected threshold level. Transitions from positive to negative voltage levels in the output signal from amplifier 167 are detected by capacitor C112 and diode D113, and are coupled to drive a multivibrator comprising transistors Q107 and Q108. The multivibrator, once triggered, provides a 50 ms on pulse which is amplified by transistors Q109 and Q110, followed by a 50 ms off time which is required by the particular counter employed in the present system. Transient suppression at the output of amplifier Q110 is provided by resistor R161 and diode D114.

The output signal from amplifier 167, which indicates the existence of a phase hit, is provided at terminal m of board 60 for external use.

Referring to FIG. 5, the output signal from amplifier 460 is applied to the automatic level control circuitry, which as specified in relation to FIG. 2, includes a voltage controlled attenuator 22, a peak detector 24, and a full wave rectifier 26. Full wave rectifier 26 corresponds to amplifiers 461 and 462 and their associated components; peak detector 24 corresponds to diode D409 and capacitor C411; and the voltage controlled attenuator 22 corresponds to field effect transistor Q421 in series with the resistor R406. The input signal is applied to resistor R406 which forms a voltage divider with the resistance of transistor Q421. The junction between R406 and Q421 is connected to amplifier 461 which has a bridge rectifier consisting of diodes D405, D406, D407, and D408 in its feedback loop to provide full wave rectification. DC stabilization for amplifier 416 is provided by resistor R413 and capacitor C408; phase compensation for the amplifier is provided by resistor R407 and capacitors C406 and C407. This particular circuit arrangement automatically compensates for a dead-band between the conductive regions of the diodes and thereby provides ideally rectified ac signals. The positive and negative rectified waveforms are summed and inverted in unity gain amplifier 462 which provides at its output terminals a full wave rectified version of the input signal applied to amplifier 461. This full wave rectified signal is applied to peak detector D409 and C411 which applies a control voltage to the gate of transistor 421 to control the voltage division between R406 and Q421 and thereby the attenuation of the signal applied to amplifier 461. The quiescent voltage division between resistor R406 and transistor Q421 is determined by the setting of variable resistor R418. An RC network comprising capacitor C405 and resistor R416 is connected at the gate of transistor Q421, the components being selected to provide a 10 second time constant for the automatic level control loop. More particularly, the gain of the loop responds to long term variations in the signal amplitude by means of appropriate internal adjustment so that the output signal from the loop is a relatively constant level. This is not to say that the fluctuation which produces gain hits, drop outs, etc. are not reflected through the loop; they are in fact so reflected. But the gain of the loop is not changed in response to these rapid fluctuations of signal level and it is this to which the 10 second time constant of the loop refers. Thus if the average level of the input signal provided by the amplifier 460 to the automatic level control loop varies, the gain of the automatic level control loop adjusts with a 10 second response time to maintain the average level of the output signal from the loop constant.

The output signal from the automatic level control loop is the full wave rectified signal provided at the output terminal of amplifier 462. This signal, at a frequency twice that of the test signal, is applied to the active low pass filter including amplifier 463, resistors R419, R421, and R422, and capacitors C412, C413, and C414. Resistor R423 and capacitors C415 and C416 are part of a phase compensating network for amplifier 463. The filter is similar to that employed with the phase locked loop on circuit board 60 and has a high frequency cut-off at approximately 250 Hz. It provides a three-pole Butterworth response using conventional design techniques. With the alternating components of the signal thus removed, the output signal from the filter is applied to each of amplifiers 464, 465 and 466. Amplifier 464 corresponds to reference amplifier 32 of FIG. 2; amplifiers 465 and 466 form part of the high low hits comparator 34 of FIG. 2. Connection of the filter signal to amplifier 464 is achieved via an integrating network comprising resistor R424 and capacitor C420. This integrating network has a 0.5 second time constant and effectively applies the long term average of the filtered signal level to amplifier 464. The signal level is amplified by approximately a factor of two and is applied across the total resistance of resistors R425, R216, R217, and R218 in series and the total resistance of resistors R426, R219, R220, R221, and R222 in series. Resistors R216, R217, and R218 comprise a resistor string having junctions connected to various positions of one-pole of two-pole four-position switch S206. The second pole of switch S206 is connected to junction between the resistor string comprising resistors R219, R220, R221, and R222. The arm of the first pole of switch S206 is connected as the second input signal to differential amplifier 465; the arm of the other pole of switch S206 is connected to provide the second input signal to differential amplifier 466. The values of the various resistors in the strings are selected to permit switch S206 to pick off appropriate voltages from the resistor strings to correspond to thresholds of $\pm 1, 2, 3$ and 6 db relative to the level of the signal at the output terminal of amplifier 464. Of course, more or less selection capability on threshold levels may be provided if desired. Importantly, however, the setting of switch S206 always provides threshold levels separated from the current average signal level by the desired number of db. In this regard the voltage across resistors R216–R222 and R425, R426 may be looked upon as providing an expanding/contracting scale, always representative of the long term average of input signal amplitude. Likewise, the various pick-offs provided by S206 always represent + and − 1, 2, 3 or 6 db levels relative to the long term average of the input signal amplitude. The threshold levels thus provided by S206 are accurate in db regardless of changes in the average signal amplitude. The output signals from amplifiers 465 and 466 are therefore at levels which reflect their proximity to the high and low amplitude thresholds selected by switch S206. The output terminals of these amplifiers are connected together via isolation diodes D410 and D411 and the common output signal is applied to the base of each of driver amplifier transistors Q401 and Q402. The output signal from amplifier Q401 is coupled to a one shot multivibrator comprising transistors Q414 and Q415 which is similar to and functions in the manner of the multivibrator comprising transistors Q107 and Q108 described above. Transistors Q417 and Q418 provide amplification of the output signal from the one shot multivibrator and the amplified signal is applied to the amplitude hits counter 38.

Importantly, a single hit, whether amplitude or phase, will register only one count in its respective hit counter regardless of the duration of the hit. Specifically, as described above in relation to the one shot multivibrator comprising Q107 and Q108 in FIG. 4, the one shot comprising Q414 and Q415 in FIG. 5 also provides a 50 ms pulse followed by a 50 ms off time. If transistor Q401 is still conducting after both 50 ms periods, indicating that either of Q465 and Q466 is providing a "threshold exceeded" output signal, the voltage applied to the one shot should still be negative. However coupling from Q401 to the one shot is ac-only, via capacitor C431, so that only transitions from positive to negative voltage are effective to trigger the one shot. Of course, multiple hits occurring within the 100 ms on-off cycle of the one shot are not discerned by the counter; however, these multiple repetitive hit situations are more in the nature of burst noise which is not properly subject to measurement by the system of the present invention.

Amplifier Q402 is employed to drive the one shot multivibrator associated with the amplitude and phase hit coincidence counter 44. More particularly, the phase hits signal derived from the output of amplifier Q167 in FIG. 4 is applied to the collector of Q402. As described above, the output signals from aplifiers Q465 and Q466 are applied in common to the base of Q402. As described above, the output signals from amplifiers Q465 and Q466 are applied in common to the base of Q402. In this configuration Q402 functions as an AND gate and is rendered conductive only when both amplitude and phase hits occur simultaneously. The coincidence multivibrator comprising transistors Q408 and Q409, and its output amplifier comprising transistors Q411 and Q412 function to drive the coincidence counter 44 in the same manner as the logic circuitry described above functions to drive hits counter 38.

The output signal from amplifier 460, prior to being fed to the automatic level control loop, is applied to a high stability, wide dynamic range peak detector consisting of transistors Q420 and Q419 in conjunction with associated components including capacitor Q417. This circuit provides a long time constant peak detector circuit having excellent linearity, dynamic range, and dc level stability. Capacitor C417 determines the drop out detector time constant which is set to filter out drop outs having durations less than 300 ms. The output signal from the detector is applied to one input terminal of differential amplifier 467. The latter also receives a dc level which is adjustable by means of resistor R424. The latter is usually set such that amplifier 467 provides an output signal at a sufficient level to trigger driver amplifier Q403 whenever the input signal falls to a level of −18 db below the normal level initially set by adjustment of R215. The range of adjustment of R134 would normally permit accommodation of levels between −15 and −30 db below the normal signal level. The output signal from amplifier 467 is applied to driver transistor Q403 which, when driven into conduction, triggers a one shot multivibrator comprising transistors Q404 and Q405, the latter providing a signal which is amplified by amplifier transistors Q406, Q407. The amplified signal is applied to the drop out counter in the form of a pulse each time a drop out to a level below that set by R434 and lasting at least 300 ms occurs.

The output signal of amplifier 467 is also applied to the base of each of transistors Q410, Q413 and Q416. These transistors, when rendered conductive by amplifier 467, serve to inhibit the one shot multivibrator in the driving circuit of each of the coincidence counter, phase hits counter, and amplitude hits counter, respectively. In this manner, once a drop out occurs, registration of counts at each of these counters is inhibited for the duration of the drop out.

Referring to FIG. 3 once again it is noted that the four-pole six-position meter switch S204 is selectively actuable to provide six different inputs to meter M201 so that the latter can measure the test signal input level, the peak-to-peak pulse jitter, the average phase jitter, and the frequency of the phase locked oscillator, all as derived on circuit board 60 illustrated in detail in FIG. 4. The output of level set control R215, as derived from circuit 461 may also be monitored at M201 by appropriate position of the meter switch S204. One other parameter is monitored, namely the output signal level of a test tone generated internally of the system. The test tone oscillator, which is an optional feature, provides a ready test signal to be appled to a system under test if a suitable external signal source is not available. This oscillator is illustrated as part of board 60 in FIG. 4 and comprises a modified Hartley oscillator including a field effect transistor Z105 and driver amplifier Z106 in combination with associated circuit components including a tank circuit inductor L201 and level control resistor R225 illustrated in FIG. 3. The test signal frequency is adjustable by means of variable capacitor C130 in the oscillator tank circuit. Normally the test tone frequency is set to 1 KHz. The test signal is provided across an output impedance of nominally 600 ohms as determined by resistor R176 in the output circuitry of driver amplifier Z106.

The oscillator described above is useful for most phase and amplitude hits monitoring purposes in that it displays excellent amplitude and frequency stability.

Such stability is required of the test signal in order that the phase and amplitude hits monitored by the system be limited to those resulting from the transmission channel under test and not be caused by the test signal source. The only serious problem presented by the test signal source described above derives from the utilization of a field effect transistor and manifests itself by rendering the output amplitude dependent upon the particular transistor selected. The basis of the problem, of course, is that field effect transistors of the same type do not have identical characteristics.

Figure 8:
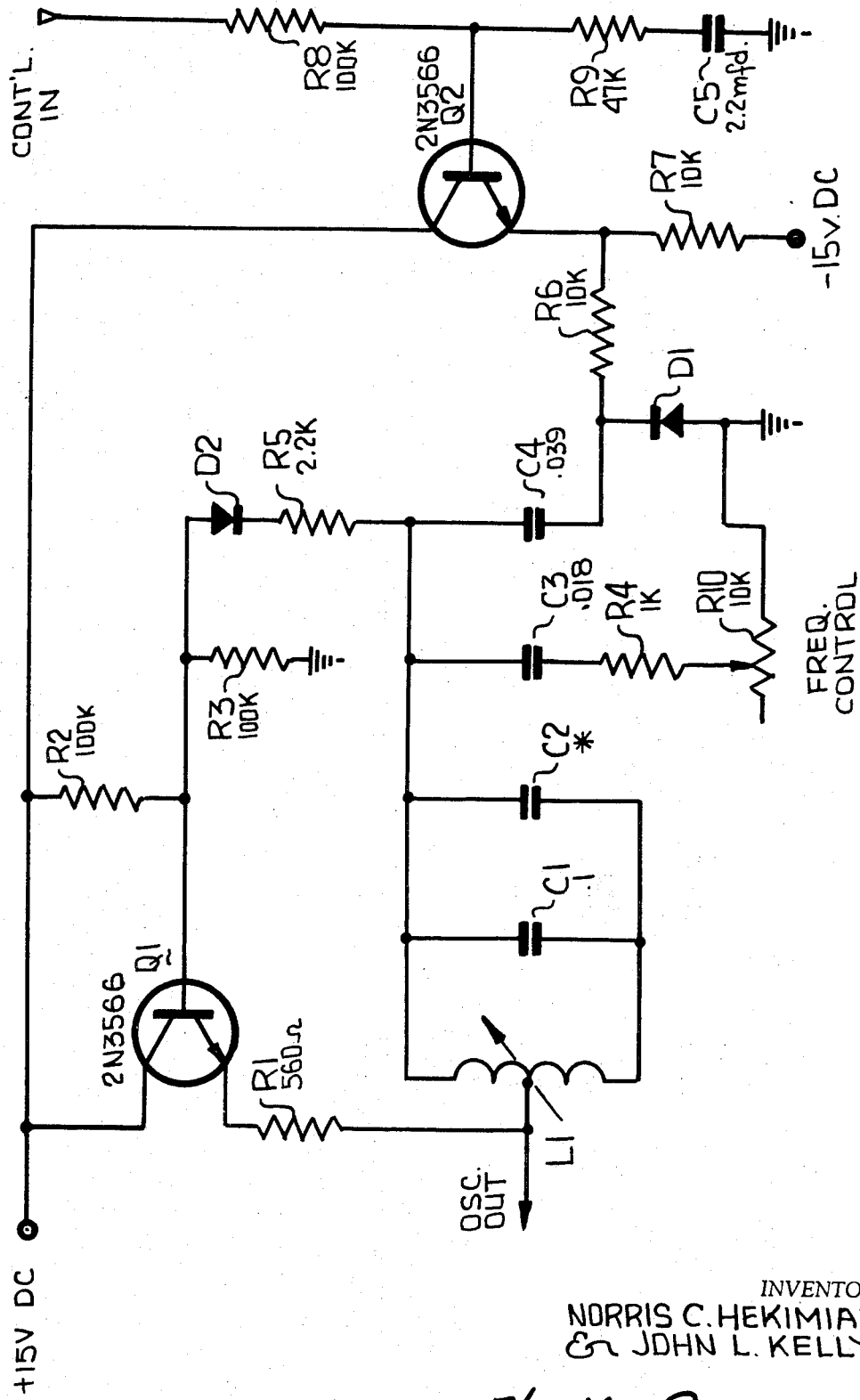
FIG. 8 is a schematic diagram of an oscillator circuit suitable for use as a test signal generator and as a voltage-controlled oscillator in the system of the present invention.

To overcome the problems caused by the field effect transistor without sacrificing the frequency and amplitude stability of the test signal, the circuit of FIG. 8 was conceived and may be readily employed in place of the test signal generator of FIG. 4. The circuit of FIG. 8 also comprises a modified Hartley oscillator wherein a conventional bipolar transistor is employed and can be replaced with silicon or germanium transistors of substantially any type. In the specific circuit illustrated, a NPN transistor Q1 has its collector tied directly to +15v dc and its base bias derived from the junction between resistor R2 and R2 connected between +15v and ground. The emitter of Q1 is connected via current-limiting resistor R1 to the center tap of choke L1 in the oscillator tank circuit, from which point the oscillator output signal may be derived. The tank circuit includes capacitors C1 and C2, each connected across L1, with the values of these components selected to provide the desired nominal frequency of the oscillator. Frequency adjustment is achieved by R10 connected in series with R4 and C3 across the tank circuit. Coupling of the tank circuit to the base of Q1 is achieved through resistor R5 and diode D2, the latter having its anode connected to transistor base. Importantly, coupling of tank circuit to the base is not achieved with the aid of the base bias resistors R2, R3, therefore R2 and R3 serve to limit the base current independently of any effects from the tank circuit. Resistor R5 serves to insure that there is adequate forward bias for the emitter — base function of Q1 plus a nominal drop across R1.

The circuit of FIG. 8, as thus far described, has a quiescent mode of operation wherein D2 becomes reverse-biased at the peak of every positive half cycle of oscillation. Importantly it is D2 which provides the necessary limiting in the oscillation loop, not Q1. D2 thus cuts off Q1 during each cycle rather than permitting Q1 to saturate and degrade the sinusoidal waveform. The amplitude of oscillation is very close to the open circuit voltage represented by the divider R2, R3 across the supply voltage.

The circuit of FIG. 8, as thus far described, provides a 1,000 Hz (nominal) signal with the component values indicated in the drawing. Amplitude stability of better than 1 db and frequency stability of better than 1 Hz was found to prevail, even when different transistor types (shown on germanium) were employed for Q1.

Although Q1 is operated approximately Class B, a good sinusoidal waveform is available either at the choke center tap or at the base lead of the tuned circuit. The self-regulating feature of the circuit, afforded by the limiting action of D2, renders the output amplitude relatively independent of loading, within the constraints of transistor gain and the effects on waveform produced by degradation of circuit Q.

The amplitude of oscillation depends upon the supply voltage because of the reference of the base divider circuit to the supply. If separate stable bias supplies were provided for R1 and R2, excellent stable operation is possible with an unregulated supply for Q1.

Also illustrated in FIG. 8 is circuitry suitable for adapting the oscillator to voltage-controlled operation whereby the oscillator may be used in place of the VCO incorporating Q103 of FIG. 4. More particularly an NPN transistor Q2 has its collector tied to the +15v supply and its emitter connected to −15v via resistor R7. Control voltage for Q2 is applied to its base via resistor R8 across the series combination of R9 and C5. The emitter of Q2 is returned to ground via resistor R6 and diode D1, the latter having its anode grounded. The junction between D1 and R6 is connected to the junction between the tank circuit and R5 via capacitor C4.

In operation, D1 acts as a reactance modulator, the phase angle at which it conducts being determined by the control signal applied to the base of Q2. The conduction angle of D1 in turn controls which portion of the oscillation cycle C4 is connected across the tank circuit, thereby controlling the phase or frequency of the oscillator.

The system as described above can perform its various parameter measurements either on an end-to-end basis or a loop around basis. More specifically, an end-to-end basis implies injection of a test signal at the transmission end of the system with the monitoring equipment located at the reception end. Under such circumstances phase and amplitude hits, various jitter measurements, etc. are indications of the transmission system performance when the latter operates in its normal fashion. Measurements based on a loop around test are performed with the test signal and monitoring equipment located at the same station. Two transmission channels are required for such a test, the channels being patched together at the distant end. Monitored parameters for a loop around test are parameters of the two channels combined. It is for the loop around type test that the internal test signal is provided.

While we have described and illustrated specific embodiments of the invention, it will be clear that variations of the details of construction which are specifically illustrated and described may be resorted to without departing from the true spirit and scope of the invention as defined in the appended claims.

We claim:

1. A system for monitoring the phase of an input signal having a predetermined frequency, said system comprising:

a voltage-controlled oscillator for providing a reference signal having a nominal frequency equal to said predetermined frequency and having a phase which is nominally displaced from the input signal phase by 90° and is variable in response to the amplitude of a control signal applied thereto;

means for converting said input signal and said reference signal to respective square waves alternating between first and second amplitude levels;

an exclusive OR gate, arranged to receive said input signal and said reference signal square waves, for providing an output square wave having a first polarity when said input signal and reference signal square waves are at different amplitude levels and having a second polarity when said input signal and reference signal square waves are at the same amplitude levels, whereby the duty cycle of said output square wave is proportional to the degree of phase displacement between said input and reference signals;

means for converting said output square wave to an output signal having an amplitude proportional to the duty cycle of said output square wave;

control means for phase-locking said reference signal to said input signal, said control means including means for applying said output signal as a control signal to said voltage-controlled oscillator;

first and second counter means;

means responsive to amplitude excursion of said output signal above a pre-established threshold level for incrementing said first counter means; and means responsive to amplitude excursions of said input signal outside a predetermined range of amplitudes for incrementing said second counter means.

2. The system according to claim 1 further comprising:

third counter means; and means responsive to simultaneous excursions of said input signal outside said predetermined range and of said output signal above said pre-established threshold for incrementing said third counter means.

3. The system according to claim 2 further comprising:

means responsive to input signal amplitude reductions on the order of at least 15 db lasting for a time period at least equal to a multiplicity of input signal cycles for inhibiting incrementation of said first, second and third counter means.

4. The system according to claim 3 further comprising fourth counter means and means responsive to each said amplitude reductions for incrementing said fourth counter means.

5. The system according to claim 1 further comprising test signal generator means for providing a test signal at said predetermined frequency to be transmitted through a signal transmission channel under test, the test signal thus transmitted comprising said input signal, said test signal generator being integrally packaged with said system.

6. The system according to claim 5 wherein said test signal generator comprises a modified Hartley oscillator configuration, including:

a bipolar transistor having collector-emitter and base electrodes;

a source of supply voltage;

means for applying said supply voltage to said collector;

a current limiting resistor connected in the collector-emitter path of said transistor;

a tuned tank circuit including a choke having a center tap and one end connected to a reference potential;

means for connecting said center tap to said collector-emitter circuit on the emitter side of said transistor;

means for coupling the other end of said choke to the base of said transistor, said means for coupling including a diode poled to conduct current in opposition to base current in said transistor; and means for establishing a dc bias for said base independently of current flow through said diode, said dc bias being such to render said transistor conductive in the absence of any effects from said tank circuit and said diode.

7. A system for monitoring the phase of an input signal having a predetermined frequency, said system comprising:

a voltage-controlled oscillator for providing a reference signal having a nominal frequency equal to said predetermined frequency and having a phase which is nominally displaced from the input signal phase by 90° and is variable in response to the amplitude of a control signal applied thereto;

means for converting said input signal and said reference signal to respective square waves alternating between first and second amplitude levels;

an exclusive OR gate, arranged to receive said input signal and said reference signal square waves, for providing an output square wave having a first polarity when said input signal and reference signal square waves are at different amplitude levels and having a second polarity when said input signal and reference signal square waves are at the same amplitude levels, whereby the duty cycle of said output square wave is proportional to the degree of phase displacement between said input and reference signals;

means for converting said output square wave to an output signal having an amplitude proportional to the duty cycle of said square wave;

control means for phase-locking said reference signal to said input signal, said control means including means for applying said output signal as a control signal to said voltage-controlled oscillator;

further means for monitoring short term amplitude variations of said input signal outside a predetermined range of amplitudes, said further means including:

means for integrating said input signal to provide an integrated signal having an amplitude representing the average amplitude of said input signal;

amplifier means for amplifying said integrated signal by a predetermined amplification factor greater than one;

a string of series-connected resistors;

means for applying said amplified integrated signal to one end of said string of resistors;

means for connecting the other end of said string of resistors to a source of reference potential; and means for picking-off a pair of voltages from said string of resistors to establish said predetermined range of amplitudes about said average amplitude of said input signal.

8. The system according to claim 7 further comprising:

first and second differential amplifiers, each having first and second signal input terminals and an output terminal for providing a predetermined signal when the signal amplitude at said first input terminal exceeds the signal amplitude at said second input terminal;

means for applying said input signal to said first signal input terminal of said first differential amplifier and to said second signal input of said second differential amplifier;

means for applying the larger of said pair of voltages to said second input terminal of said first differential amplifier; and means for applying the smaller of said pair of voltages to the first input terminal of said second differential amplifier.

9. The system according to claim 8 wherein said amplification factor is two, and further comprising double-pole switch means connected to said string of resistors for permitting selection of amplitude ranges of ± 6 db and ± 3 db, about said average amplitude of said input signal.

10. A system for monitoring the phase of an input signal having a predetermined frequency, said system comprising:

a voltage-controlled oscillator for providing a reference signal having a nominal frequency equal to said predetermined frequency and having a phase which is nominally displaced from the input signal phase by 90° and is variable in response to the amplitude of a control signal applied thereto;

means for converting said input signal and said reference signal to respective square waves alternating between first and second amplitude levels;

an exclusive OR gate, arranged to receive said input signal and said reference signal square waves, for providing an output square wave having a first polarity when said input signal and reference signal square waves are at different amplitude levels and having a second polarity when said input signal and reference signal square waves are at the same amplitude levels, whereby the duty cycle of said output square wave is proportional to the degree of phase displacement between said input and reference signals;

means for converting said output square wave at an output signal having an amplitude proportional to the duty cycle of said output square wave;

control means for phase-locking said reference signal to said input signal, said control means including means for applying said output signal as a control signal to said voltage-controlled oscillator;

a high pass filter, arranged to receive said output signal from said means for converting, for providing a filtered signal from which the dc component of said output signal is removed, the amplitude of said filtered signal varying in response to instantaneous phase differences between said input and reference signals; and monitoring means for providing a measurement signal having an amplitude proportional to a specified parameter of said filtered signal.

11. The system according to claim 10 wherein said monitoring means comprises:

rectifier means for full wave rectifying said filter signal; and average jitter detection means responsive to the full wave rectified and filtered signal for providing a dc signal having an amplitude corresponding to the average value of the amplitude of said full wave rectified and filtered signal.

12. The system according to claim 11 further comprising peak-to-peak jitter detection means for providing a further dc signal having an amplitude proportional to the peak-to-peak amplitude of said full wave rectified and filtered signal.

13. The system according to claim 10 wherein said monitoring means comprises:

rectifier means for full wave rectifying said filtered signal; and peak-to-peak jitter detection means for providing a dc signal having an amplitude proportional to the peak-to-peak amplitude of said full wave rectified and filtered signal.

14. A system for monitoring the phase of an input signal having a predetermined frequency, said system comprising:

a voltage-controlled oscillator for providing a reference signal having a nominal frequency equal to said predetermined frequency and having a phase which is nominally displaced from the input signal phase by 90° and is variable in response to the amplitude of a control signal applied thereto;

means for converting said input signal and said reference signal to respective square waves alternating between first and second amplitude levels;

an exclusive OR gate, arranged to receive said input signal and said reference signal square waves, for providing an output square wave having a first polarity when said input signal and reference signal square waves are at different amplitude levels and having a second polarity when said input signal and reference signal square waves are at the same amplitude levels, whereby the duty cycle of said output square wave is proportional to the degree of phase displacement between said input and reference signals;

means for converting said output square wave to an output signal having an amplitude proportional to the duty cycle of said output square wave;

control means for phase-locking said reference signal to said input signal, said control means including means for applying said output signal as a control signal to said voltage-controlled oscillator;

a counter; and means responsive to each input signal amplitude reduction on the order of at least 15 db lasting for a time period at least equal to a multiplicity of input signal cycles for incrementing said counter.

15. A system for counting phase variations of at least a predetermined magnitude and subsisting for at least a predetermined time interval in an input signal of known frequency, said system comprising:

a voltage-controlled oscillator for providing a reference signal having a nominal frequency equal to said predetermined frequency and having a phase which is nominally displaced from the input signal phase by 90° and is variable in response to the amplitude of a control signal applied thereto;

means for converting said input signal and said reference signal to respective square waves alternating between first and second amplitude levels;

an exclusive OR gate, arranged to receive said input signal and said reference signal square waves, for providing an output square wave having a first polarity when said input signal and reference signal square waves are at different amplitude levels and having a second polarity when said input signal and reference signal square waves are at the same amplitude levels, whereby the duty cycle of said output square wave is proportional to the degree of phase displacement between said input and reference signals;

means for converting said output square wave to an output signal having an amplitude proportional to the duty cycle of said output square wave;

control means for phase-locking said reference signal to said input signal, said control means including means for applying said output signal as a control signal to said voltage-controlled oscillator;

means for establishing a reference signal of constant amplitude;

a phase hit counter; and means responsive to said reference signal and said output signal for incrementing said counter each time the amplitude of said output signal exceeds said constant amplitude.

16. The system according to claim 15 further comprising timing means for actuating said phase hit counter for a specified time interval and inhibiting incrementation of said phase hit counter at other times.

17. The system according to claim 15 further comprising:

a sensory-perceptible indicator;

means for actuating said indicator each time the amplitude of said output signal exceeds said constant amplitude.

18. The system according to claim 15 further comprising:

a high pass filter, arranged to receive said output signal from said means for converting, for providing a filtered signal from which the dc component of said output signal is removed, the amplitude of said filtered signal varying in response to instantaneous phase differences between said input and reference signals; and monitoring means for providing a measurement signal having an amplitude proportional to a specified parameter of said filtered signal.

19. The system according to claim 18 wherein said monitoring means comprises:

rectifier means for full wave rectifying said filter signal; and average jitter detection means responsive to the full wave rectified and filtered signal for providing a dc signal having an amplitude corresponding to the average value of the amplitude of said full wave rectified and filtered signal.

20. The system according to claim 18 wherein said monitoring means comprises:

rectifier means for full wave rectifying said filtered signal; and peak-to-peak jitter detection means for providing a dc signal having an amplitude proportional to the peak-to-peak amplitude of said full wave rectified and filtered signal.

21. The system according to claim 15 comprising further means for monitoring short term amplitude variations of said input signal outside a predetermined range of amplitudes, said further means including:

means for integrating said input signal to provide an integrated signal having an amplitude representing the average amplitude of said input signal;

amplifier means for amplifying said integrated signal by a predetermined amplification factor greater than one;

a string of series-connected resistors;

means for applying said amplified integrated signal to one end of said string of resistors;

means for connecting the other end of said string of resistors to a source of reference potential; and means for picking-off a pair of voltages from said string of resistors to o establish said predetermined range of amplitudes about said average amplitude of said input signal.

22. The system according to claim 21 further comprising:

first and second differential amplifiers, each having first and second signal input terminals and an output terminal for providing a predetermined signal when the signal amplitude at said first input terminal exceeds the signal amplitude at said second input terminal;

means for applying said input signal to said first signal input terminal of said first differential amplifier and to said second signal input of said second differential amplifier;

means for applying the larger of said pair of voltages to said second input terminal of said first differential amplifier; and means for applying the smaller of said pair of voltages to the first input terminal of said second differential amplifier.

* * * * *